Figure 1:
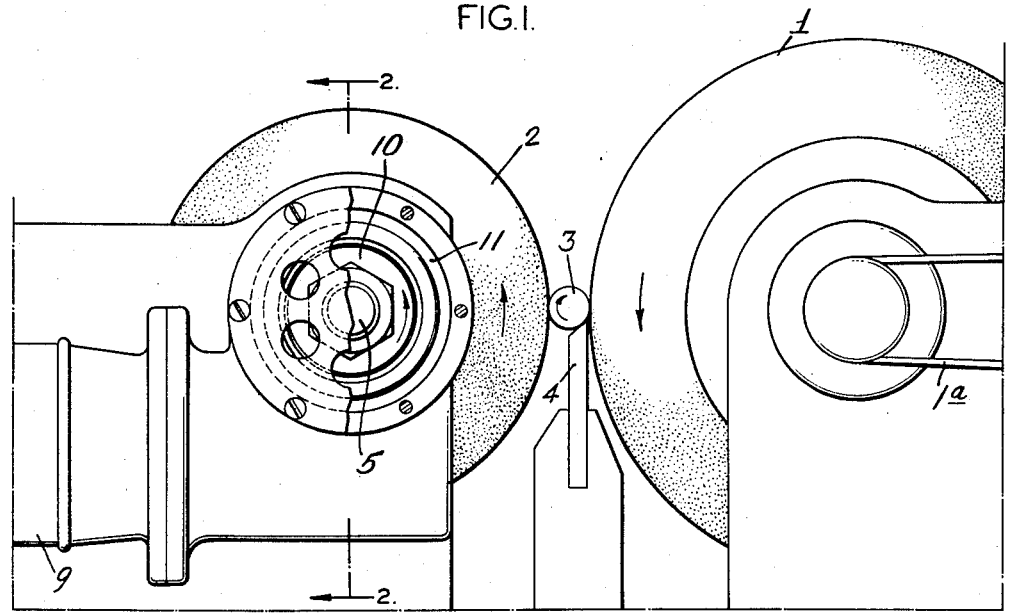

Feb. 10, 1959  C. G. EKHOLM  2,872,757
DRIVING MECHANISM FOR THE REGULATING WHEELS
OF CENTERLESS GRINDING MACHINES
Filed March 8, 1957

INVENTOR:
CARL GUSTAF EKHOLM
BY Howson & Howson
ATTYS.

United States Patent Office 2,872,757
Patented Feb. 10, 1959

2,872,757

DRIVING MECHANISM FOR THE REGULATING WHEELS OF CENTERLESS GRINDING MACHINES

Carl Gustaf Ekholm, Lidköping, Sweden, assignor to Lidköpings Mekaniska Verkstads Aktiebolag, Lidköping, Sweden, a corporation of the Kingdom of Sweden Application March 8, 1957, Serial No. 644,769

Claims priority, application Sweden March 9, 1956

5 Claims. (Cl. 51—103)

The present invention relates to improvements in the driving mechanism for the regulating wheels in centerless grinding machines.

Regulating wheels of centerless grinding machines are usually driven by a separate motor through a belt, a chain, or a worm gear through a gear box or the like. In certain cases a variable speed motor is used, in which case the motor is connected directly to the worm gear.

The accuracy of the geometrical form and the surface quality of the product ground in the machine depends to a great extent on smooth, regular rotation of the regulating wheel and considerable thought has therefore been given to improving the driving and transmission mechanism of the regulating wheel.

During grinding the regulating wheel is subjected to a variable torque depending on the force which at each moment is required for removing material from the work piece. When the grinding wheel is out of contact with the work the motor drives the regulating wheel spindle through the transmission, which, for example, may be a worm gear. If, on the other hand, the rotating grinding wheel comes into contact with the work and acts upon the latter with a certain pressure the regulating wheel with its transmission and motor will instead act to retard the rotation of the work piece and thus govern its speed of rotation. In rough grinding the regulating wheel must counteract the whole of the force transferred to the periphery of the work piece from the driving motor for the grinding wheel less that lost through friction between the work piece and the work rest blade. During the finish grinding, as the depth of the cut successively decreases to nil during the final sparking out, the torque, which must be counteracted by the regulating wheel decreases and finally becomes infinitely small. If there is play or elasticity in the transmission mechanism to the regulating wheel spindle the peripheral speed of the regulating wheel will be irregular, due to the backlash in the gear, which is subjected to forces alternately from the driving motor and from the grinding wheel.

The usual driving mechanism for the regulating wheel is a worm gear. In this type of gear there is always a certain amount of play between the worm and the worm wheel and this play is quickly augmented through wear since the contacting surfaces in a worm gear are comparatively small. Further the injurious effects of the play are increased because the diameter of the worm wheel is necessarily considerably smaller than the diameter of the regulating wheel and any inaccuracies in the gear are therefore multiplied at the periphery of the regulating wheel.

The invention relates to a driving mechanism for the regulating wheel by means of which the peripheral speed of the regulating wheel is maintained as constant as possible under all phases of the grinding operation and is characterized mainly by auxiliary driving means adapted to exert upon the regulating wheel spindle a torque directed in the same direction as the torque exerted on the spindle through the contact of the grinding wheel with the work piece, the said torque acting upon the spindle with unaltered magnitude even during decreasing pressure of the grinding wheel on the work.

The auxiliary driving means may for example comprise an electric motor with comparatively small flexible torque. The motor serves merely to overcome the friction in the spindle bearings and in certain cases the friction between the work and the regulating wheel and work rest respectively in order to eliminate the backlash and elasticity in the driving gear.

The invention is further explained with reference to the accompanying drawings showing a driving mechanism for a regulating wheel driven according to the invention. Since centerless grinding machines are well known in the art only those parts necessary for a clear understanding of the invention have been included in the drawings. The invention is described and illustrated in connection with a machine in which the regulating wheel is driven through a worm gear since this system is the most common, although it will be understood that the invention is with certain modifications applicable to other types of driving mechanism.

Figure 2:
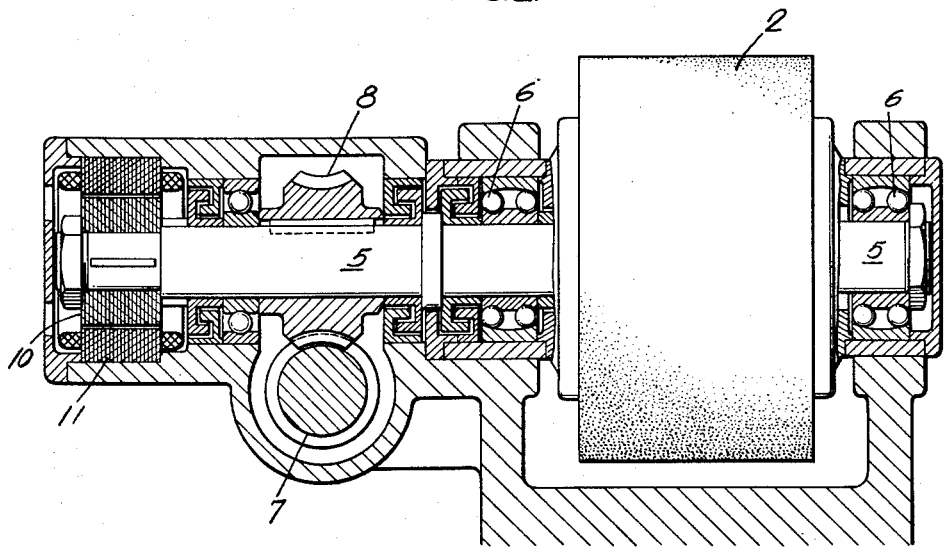

In the drawings, Fig. 1 is a fragmentary side elevational view of a grinding machine in accordance with the invention; and Fig. 2 is a sectional view on the line 2—2, Fig. 1.

In the drawing, 1 is the grinding wheel which is driven through a belt 1a from a separate motor (not shown), 2 the regulating wheel, 3 the work piece and 4 the work rest upon which the work is supported during the grinding operation. The directions of rotation of the wheels and the work are indicated by arrows. The regulating wheel spindle is indicated by the numeral 5, and 6 are the bearings for the spindle. A worm gear 7 and 8 drives, or retards, the regulating wheel respectively according to conditions. The worm gear is driven by a motor 9. A rotor 10 is mounted on the spindle 5 and a stator 11 is fixed to the spindle housing. The rotor and stator together form a high slip electric motor which imparts to the regulating wheel spindle, the beforementioned torque. The arrow on the rotor 10 in Fig. 1 indicates the direction in which the torque acts and the motor is made to rotate the rotor at a somewhat higher speed when runnnig idle than the speed of the regulating wheel spindle obtained from the worm gear.

Because of the torque exerted on the spindle by the motor 10—11 the contact conditions in the worm gear will be the same whether or not the machine is actually grinding. In other words the arrangement is such that the driving means 7—8 for the spindle always have a retarding effect. The injurious effects of backlash in the driving mechanism are thus eliminated.

The invention is not limited to the embodiment described above. Other means and arrangements may be used to attain the desired functions. Thus it is possible to use instead of the special motor 10—11 a normal electric motor which if desired may be provided with a slip coupling or the like. Instead of the electric motor it is also possible to use hydraulically or pneumatically actuated means for generating the torque.

In order to prevent unnecessary wear on the transmission elements through the extra load to which they are subjected through the application of the invention it is possible to disconnect the torque generating member during periods when great accuracy is not required. This can be accomplished either manually or automatically. For instance when the machine is being used for through grinding of work pieces the torque generator can be connected manually before the finish pass for attaining the desired accuracy and when the machine is being used for plunge grinding the torque generator can be automatically connected when the grinding wheel comes into contact with the work or when the work approaches finished size.

What is claimed is:

1. In drive mechanism for the regulating wheels of centerless grinding machines and in combination with the primary drive means for said wheel, an auxiliary drive means for exerting a torque upon the said regulating wheel in the same direction as the torque exerted on the regulating wheel through the work by the grinding wheel, said auxiliary driving torque acting continuously upon the regulating wheel during contact of the grinding wheel with the work.

2. In a centerless grinding machine comprising peripherally opposed grinding and regulating wheels and means for positioning a work piece between said wheels, means for driving the grinding wheel, a primary drive means for the regulating wheel, and auxiliary drive means for the regulating wheel acting continuously to exert a torque on the regulating wheel in the same direction as the torque exerted on the regulating wheel through the work by the grinding wheel.

3. A centerless grinding machine according to claim 2 including a spindle for the regulating wheel, and wherein the auxiliary drive consists of a motor connected directly to the spindle.

4. A centerless grinding machine according to claim 3 wherein the said auxiliary drive motor is an electric motor having stator and rotor elements of which the rotor is mounted directly on the said spindle.

5. A centerless grinding machine according to claim 2 including a spindle for the regulating wheel, and wherein the said primary drive means comprises a motor and worm gear connecting the motor to the spindle.

References Cited in the file of this patent

UNITED STATES PATENTS 2,735,237     Balsiger  ---------------- Feb. 21, 1956